United States Patent
Kang et al.

(10) Patent No.: US 11,562,235 B2
(45) Date of Patent: Jan. 24, 2023

(54) ACTIVATION FUNCTION COMPUTATION FOR NEURAL NETWORKS

(71) Applicant: INTERNATIONAL BUSINESS MACHINES CORPORATION, Armonk, NY (US)

(72) Inventors: Mingu Kang, Old Tappan, NJ (US); Kyu-Hyoun Kim, Chappaqua, NY (US); Seyoung Kim, White Plains, NY (US); Chia-Yu Chen, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 440 days.

(21) Appl. No.: 16/797,587

(22) Filed: Feb. 21, 2020

(65) Prior Publication Data

US 2021/0264247 A1 Aug. 26, 2021

(51) Int. Cl.
  *G06N 3/08* (2006.01)
  *G06N 3/04* (2006.01)

(52) U.S. Cl.
  CPC ............. *G06N 3/08* (2013.01); *G06N 3/04* (2013.01)

(58) Field of Classification Search
  None
  See application file for complete search history.

(56) References Cited

U.S. PATENT DOCUMENTS

| 10,242,311 B2 | 3/2019 | Lo |
| 10,366,322 B2 | 7/2019 | David |
| 2019/0041961 A1 | 2/2019 | Desai |

(Continued)

FOREIGN PATENT DOCUMENTS

| CN | 107392305 A | 11/2017 |
| CN | 110084361 A | 8/2019 |

OTHER PUBLICATIONS

Amirtharajah et al., "A Micropower Programmable DSP Using Approximate Signal Processing Based on Distributed Arithmetic," IEEE Journal of Solid-State Circuits, vol. 39, No. 2, pp. 337-347. Feb. 2004.

(Continued)

*Primary Examiner* — Aaron M Richer
(74) *Attorney, Agent, or Firm* — Cantor Colburn LLP; Daniel Yeates

(57) ABSTRACT

A computer-implemented method for improving the efficiency of computing an activation function in a neural network system includes initializing, by a controller, weights in a weight vector associated with the neural network system. Further, the method includes receiving, by the controller, an input vector of input values for computing a dot product with the weight vector for the activation function, which determines an output value of a node in the neural network system. The method further includes predicting, by a rectifier linear unit (ReLU), which computes the activation function, that the output value of the node will be negative based on computing an intermediate value for computing the dot product, and based on a magnitude of the intermediate value exceeding a precomputed threshold value. Further, the method includes, in response to the prediction, terminating, by the ReLU, the computation of the dot product, and outputting a 0 as the output value.

18 Claims, 8 Drawing Sheets

(56) References Cited

U.S. PATENT DOCUMENTS

| | | | |
|---|---|---|---|
| 2019/0080238 A1 | 3/2019 | Wang | |
| 2019/0205746 A1* | 7/2019 | Nurvitadhi | |
| 2020/0065659 A1* | 2/2020 | Lee | G06N 3/063 |
| 2020/0327402 A1* | 10/2020 | Lesso | G06N 3/0635 |
| 2020/0371745 A1* | 11/2020 | Lee | G06F 7/74 |
| 2021/0110234 A1* | 4/2021 | Qin | G06N 3/04 |
| 2021/0232894 A1* | 7/2021 | Yamada | G06F 17/10 |

OTHER PUBLICATIONS

Stanley A. White, "Applications of Distributed Arithmetic to Digital Signal Processing: A Tutorial Review," IEEE ASSP Magazine, Jul. 1989. 9 pages.

Whatmough et al., "A 28nm SoC with a 1.2GHz 568nJ/Prediction Sparse Deep-Neural-Network Engine with >0.1 Timing Error Rate Tolerance for IoT Applications", 2017 IEEE International Solid-State Circuits Conference. 67 pages.

Jang et al., "MnnFast: A Fast and Scalable System Architecture for Memory-Augmented Neural Networks," Proceedings of the 46th International Symposium on Computer Architecture, Jun. 2019, pp. 250-263.

Krizhevsky et al., "ImageNet Classification with Deep Convolutional Neural Networks," Advances in Neural Information Processing Systems, 2012, pp. 1-9.

Zhu et al., "Method and System for Mining Fashion Outfit Composition Using an End-to-End Deep Learning Approach on Datasets," IP.com Prior Art Database Technical Disclosure, IPCOM000251182D, Oct. 23, 2017, 6 pages.

\* cited by examiner

ACTIVATION FUNCTION COMPUTATION FOR NEURAL NETWORKS

BACKGROUND

The present invention relates generally to computing technology, and particularly to improved efficiency of neural network computations by facilitating an efficient dot-product computation using predictive zero-skipping during activation function computations.

Deep learning has led to state-of-the-art improvements in the accuracy of many artificial intelligence tasks such as large-category image classification and recognition; speech recognition, and nature language processing. Neural networks have demonstrated an ability to learn such skills as face recognition, reading, and the detection of simple grammatical structure. More particularly, neural networks can be considered to be models defining a multivariate function or a distribution over a set of discrete classes. In some instances, neural network models can be associated with a particular learning method or learning rule. The deep learning architecture can involve complex and many-layered neural networks (e.g., deep neural networks (DNN)) that can require intense computation for training and/or evaluation.

The ability to train increasingly deep networks has been due, in part, to the development of pre-training algorithms and forms of random initialization, as well as the availability of faster computers.

SUMMARY

According to one or more embodiments of the present invention, a computer-implemented method for improving the efficiency of computing an activation function in a neural network system includes initializing, by a controller, weights in a weight vector associated with the neural network system. Further, the method includes receiving, by the controller, an input vector of input values for computing a dot product with the weight vector for the activation function, which determines an output value of a node in the neural network system. The method further includes predicting, by a rectifier linear unit (ReLU), which computes the activation function, that the output value of the node will be negative based on computing an intermediate value for computing the dot product, and based on a magnitude of the intermediate value exceeding a precomputed threshold value. Further, the method includes, in response to the prediction, terminating, by the ReLU, the computation of the dot product, and outputting a 0 as the output value.

According to one or more embodiments of the present invention, a system for implementing a machine learning function includes at least one rectifier linear unit (ReLU), and at least one controller coupled with the at least one ReLU to perform a method for computing a dot product. The method includes initializing weights in a weight vector. The method further includes receiving an input vector of input values for computing the dot product of the input vector with the weight vector. The method further includes predicting that the output value of the dot product will be negative by computing an intermediate value for computing the dot product, and based on a magnitude of the intermediate value exceeding a precomputed threshold value. The method further includes, in response to the prediction, terminating the computation of the dot product, and outputting a 0 as the result of the dot product.

According to one or more embodiments of the present invention, a rectifier linear unit (ReLU) includes a storage medium, a comparator, several multipliers, and an adder tree. The ReLU performs a method for computing a dot product. The method includes initializing weights in a weight vector. The method further includes receiving an input vector of input values for computing the dot product of the input vector with the weight vector. The method further includes predicting that the output value of the dot product will be negative by computing an intermediate value for computing the dot product, and based on a magnitude of the intermediate value exceeding a precomputed threshold value. The method further includes, in response to the prediction, terminating the computation of the dot product, and outputting a 0 as the result of the dot product.

In one or more embodiments of the present invention, the intermediate value is computed at each computation cycle b as $Sb=2^{B-b-1}s_{B-1}+2^{B-b-2}s_{B-2}+\ldots s_b$, wherein B is number of bits used to represent each x, and sb is the sum of the dot products of the b-th bits of each input value. in one or more embodiments of the present invention, the dot product is computed as part of computing an activation function.

Additional technical features and benefits are realized through the techniques of the present invention. Embodiments and aspects of the invention are described in detail herein and are considered a part of the claimed subject matter. For a better understanding, refer to the detailed description and to the drawings.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describe having a communications path between two elements and do not imply a direct connection between the elements with no intervening elements/connections between them. All of these variations are considered a part of the specification.

DETAILED DESCRIPTION

The subject disclosure is directed to computer processing systems, computer-implemented methods, apparatus and/or computer program products that facilitate an efficiency within a neural network. A neural network (sometimes referred to as an artificial neural network, or a deep neural network) generally is a computer system that seeks to mimic a brain. A neural network can be utilized in a variety of ways, such as by being trained to identify the presence of human faces in images, or translate spoken speech from a first language to a second language.

A neural network generally contains multiple neurons, and connections between those neurons. A neuron generally is a part of a neural network computer system that determines an output based on one or more inputs (that can be weighted), and the neuron can determine this output based on determining the output of an activation function with the possibly-weighted inputs. Examples of activation functions include a rectifier/rectified linear unit (ReLU) activation function, which produces an output that ranges between 0 and infinity, inclusive; tan h, which produces an output that ranges between −1 and 1, inclusive; and sigmoid, which produces an output that ranges between 0 and 1, inclusive. While several of the non-limiting examples described herein concern a ReLU activation function, it can be appreciated that these techniques can be applied to other activation functions.

Figure 1:
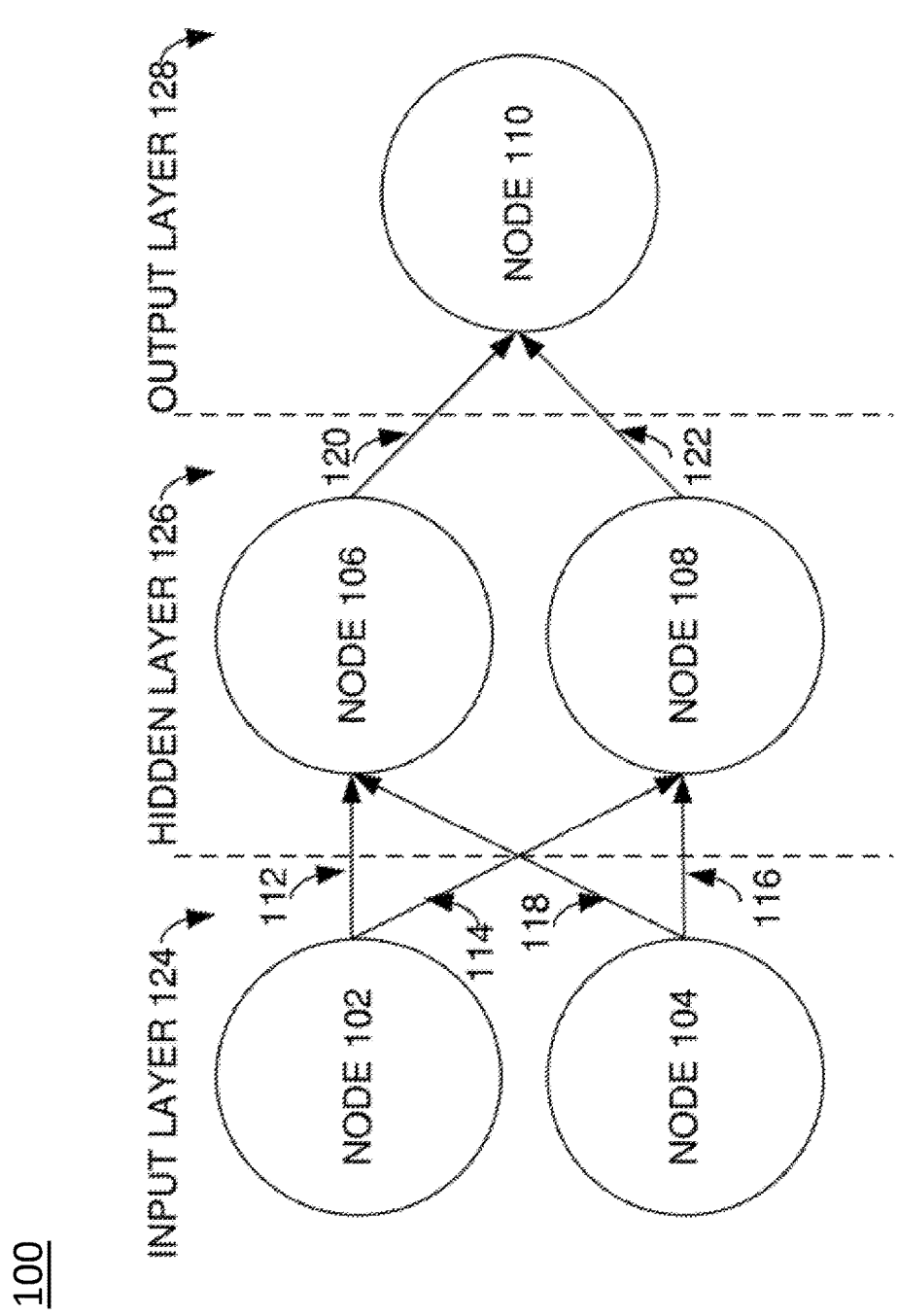
FIG. 1 illustrates an example, non-limiting neural network system for which an efficiency can be facilitated in accordance with one or more embodiments of the invention.

FIG. 1 illustrates an example, non-limiting neural network system for which an efficiency can be facilitated in accordance with one or more embodiments described herein. The neurons of a neural network can be connected, so that the output of one neuron can serve as an input to another neuron. Neurons within a neural network can be organized into layers, as shown in FIG. 1. The first layer of a neural network can be called the input layer (124), the last layer of a neural network can be called the output layer (128), and any intervening layers of a neural network can be called a hidden layer (126). Aspects of systems (e.g., system 100 and the like), apparatuses or processes explained herein can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. Repetitive description of like elements employed in respective embodiments is omitted for sake of brevity.

The system 100 and/or the components of the system 100 can be employed to use hardware and/or software to solve problems that are highly technical in nature, that are not abstract and that cannot be performed as a set of mental acts by a human. For example, system 100 and/or the components of the system 100 can be employed to use hardware and/or software to perform operations including facilitating an efficiency within a neural network. Further, some of the processes performed can be performed by specialized computers for carrying out defined tasks related to facilitating an efficiency within a neural network. System 100 and/or components of the system 100 can be employed to solve new problems that arise through advancements in technology, computer networks, the Internet and the like. System 100 can further provide technical improvements to live and Internet based learning systems by improving processing efficiency among processing components associated with facilitating an efficiency within a neural network.

System 100, as depicted in FIG. 1, is a neural network that includes five neurons—neuron 102, neuron 104, neuron 106, neuron 108, and neuron 110. The input layer 124 of this neural network is comprised of neuron 102 and neuron 104. The hidden layer 126 of this neural network is comprised of neuron 106 and neuron 108. The output layer 128 of this neural network is comprised of neuron 110. Each of the neurons of input layer 124 is connected to each of the neurons of hidden layer 126. That is, a possibly-weighted output of each neuron of input layer 124 is used as an input to each neuron of hidden layer 126. Then, each of the neurons of hidden layer 126 is connected to each of the neurons (here, one neuron) of output layer 128.

The neural network of system 100 presents a simplified example so that certain features can be emphasized for clarity. It can be appreciated that the present techniques can be applied to other neural networks, including ones that are significantly more complex than the neural network of system 100.

Figure 2:
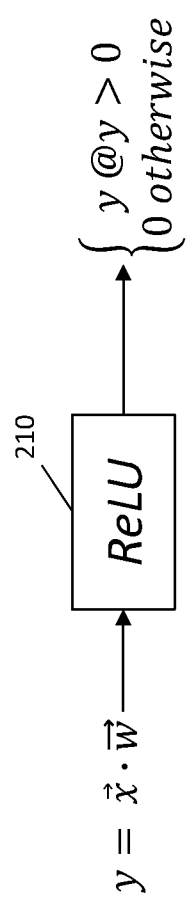
FIG. 2 depicts a rectifier linear unit (ReLU) according to one or more embodiments of the present invention.

In the context of artificial neural networks, an ReLU provides an activation function that is generally referred to as "rectifier", which is defined as the positive part of its argument: $f(x)=x^+=\max(0,x)$, where x is the input to a neuron (102-110). FIG. 2 depicts a ReLU 210 according to one or more embodiments of the present invention. Here, consider that the ReLU 210 receives a vector $\vec{x}$ as an input and $\vec{w}$ is a vector of weight assigned to a neuron associated with the ReLU 210. The ReLU 210 computes an output y as a scalar dot product of the input $\vec{x}$ and the weights $\vec{w}$. However, the ReLU 210 only outputs a positive y; if the product of $\vec{x}$ and $\vec{w}$ results in a negative value, the output y is 0 (zero).

A neural network, such as system 100, can include large number of such ReLUs 210 (e.g. thousands) that compute the scalar dot products that are passed from one layer to another until a final result of the neural network 100 is obtained. The performance of the neural network 100 can be improved if the efficiency of the dot product computation can be improved. For example, it can be energy-efficient if a negative value result of the dot product can be predicted even before computing the entire $\vec{x} \cdot \vec{w}$ so that the ReLU 210 can provide output=0 without fully computing the dot product of the vectors. Embodiments of the present invention address such technical challenges and facilitate technical improvements to the dot product computations. One or more embodiments of the present invention facilitate predicting the negative inner product output at early stages. Further, one or more embodiments of the present invention facilitate hardware components to support such negative result detection and aborting the dot product computation dynamically and providing the zero output instead.

Figure 3:
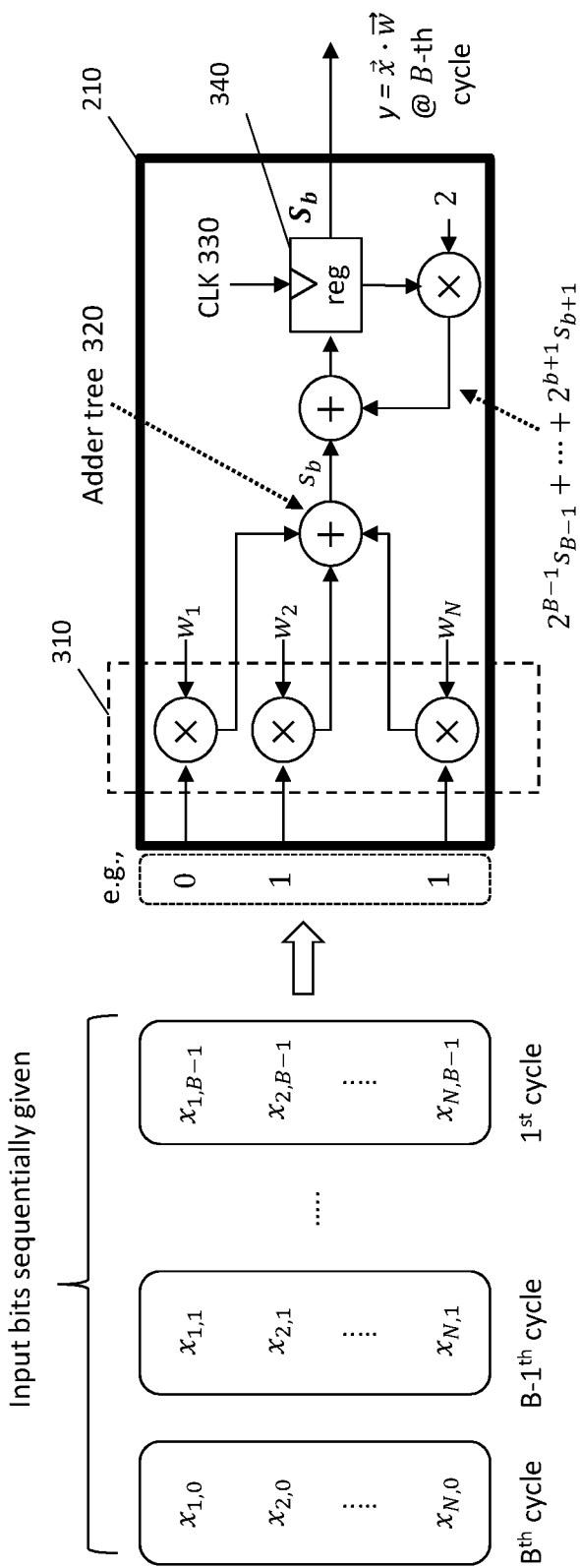
FIG. 3 depicts a typical ReLU for computing a bit-wise dot product according to conventional techniques.

FIG. 3 depicts an ReLU for computing a bit-wise dot product. The depiction in FIG. 3 describes bit-serial computation for computing the dot product where most significant bit (MSB) is computed first and least significant bit (LSB) is computed last. If the number of bits in the input values (x) is B, the scalar dot product is computed over B cycles, each cycle computing a bitwise products (310) with the weights (w). The result of the bitwise products is accumulated using an adder tree 320. A clock 330 causes each cycle to change. As depicted, in a first cycle the LSB, i.e., bit number B−1 from each x in the input vector x is input to the ReLU 210. Sequentially, for each cycle until the Bth cycle, the next bit from each x value is input. The Bth cycle uses the MSB, i.e., bit number 0 to complete the computation.

The output ($s_b$) from the adder tree 320 at any cycle b, provides b-th bit's partial sum. In other words, $s_b$ provides output of adder tree 320 at given cycle b. The final dot product can be represented as $\vec{x} \cdot \vec{w} = s_0 + 2s_1 + \ldots + 2^{B-1}s_{B-1}$. Alternatively, or in addition, a total accumulated value at the adder tree 320 at any given cycle b can be represented as $S_b=2^{B-b-1}s_{B-1}+2^{B-b-2}s_{B-2}+\ldots s_b$. The output from the adder tree 320 is stored in a register 340 in one or more examples.

Figure 4:
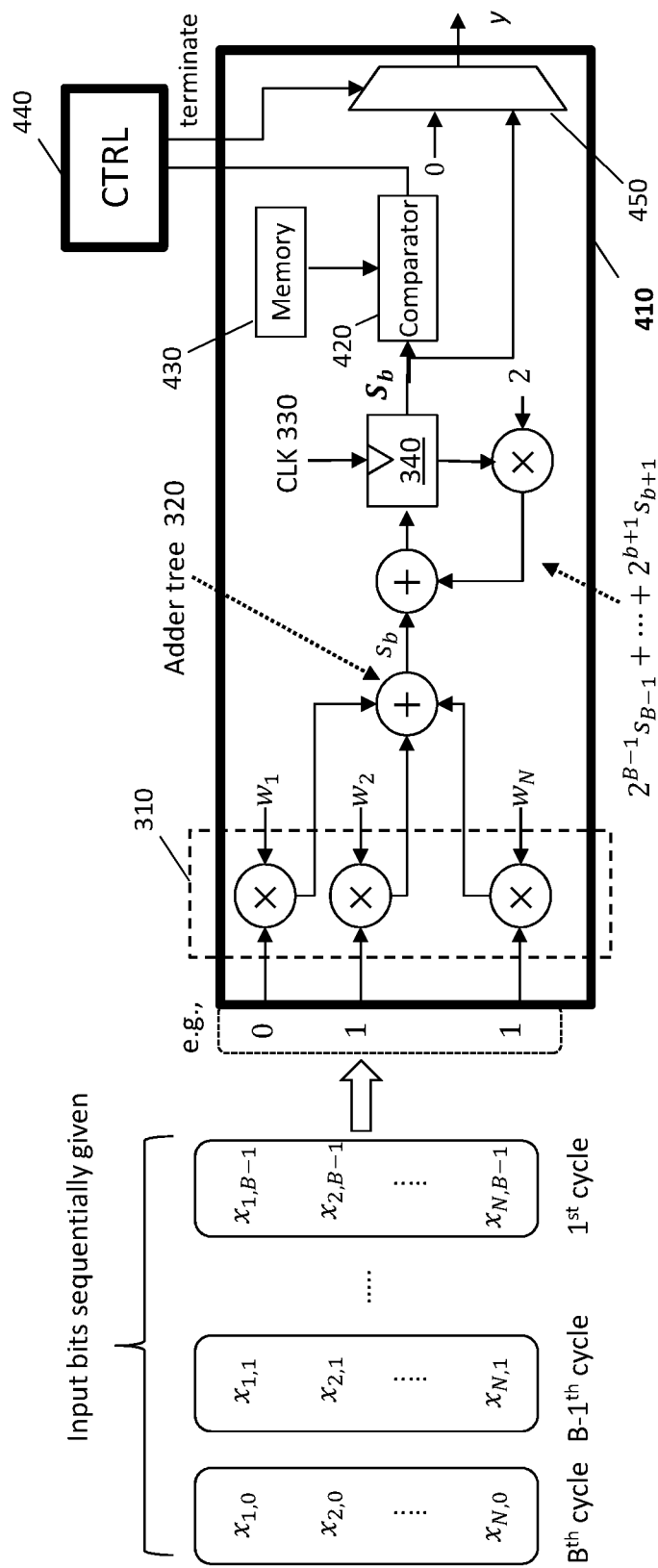
FIG. 4 depicts an ReLU for computing a dot product in a bit-wise manner according to one or more embodiments of the present invention.

FIG. 4 depicts an ReLU for computing a dot product in a bit-wise manner using a prediction according to one or more embodiments of the present invention. As can be seen an ReLU 410 according to one or more embodiments of the present invention includes a comparator 420 and a threshold table in a memory 430 that facilitate to detect a negative value at as early as possible stage during the dot product computation. After each cycle which computes each bit position of x, as described with respect to FIG. 3, the accumulated result $S_b$ is compared with a value from the threshold table. If it is determined that $\vec{x}\cdot\vec{w}$ is going to be negative regardless of the remaining computation, based on the comparison, controller 440 terminates the computation and sets the output to 0 using a multiplexer 450. The ReLU 410 can be included in a computing device that implements a neural network system 100.

Figure 5:
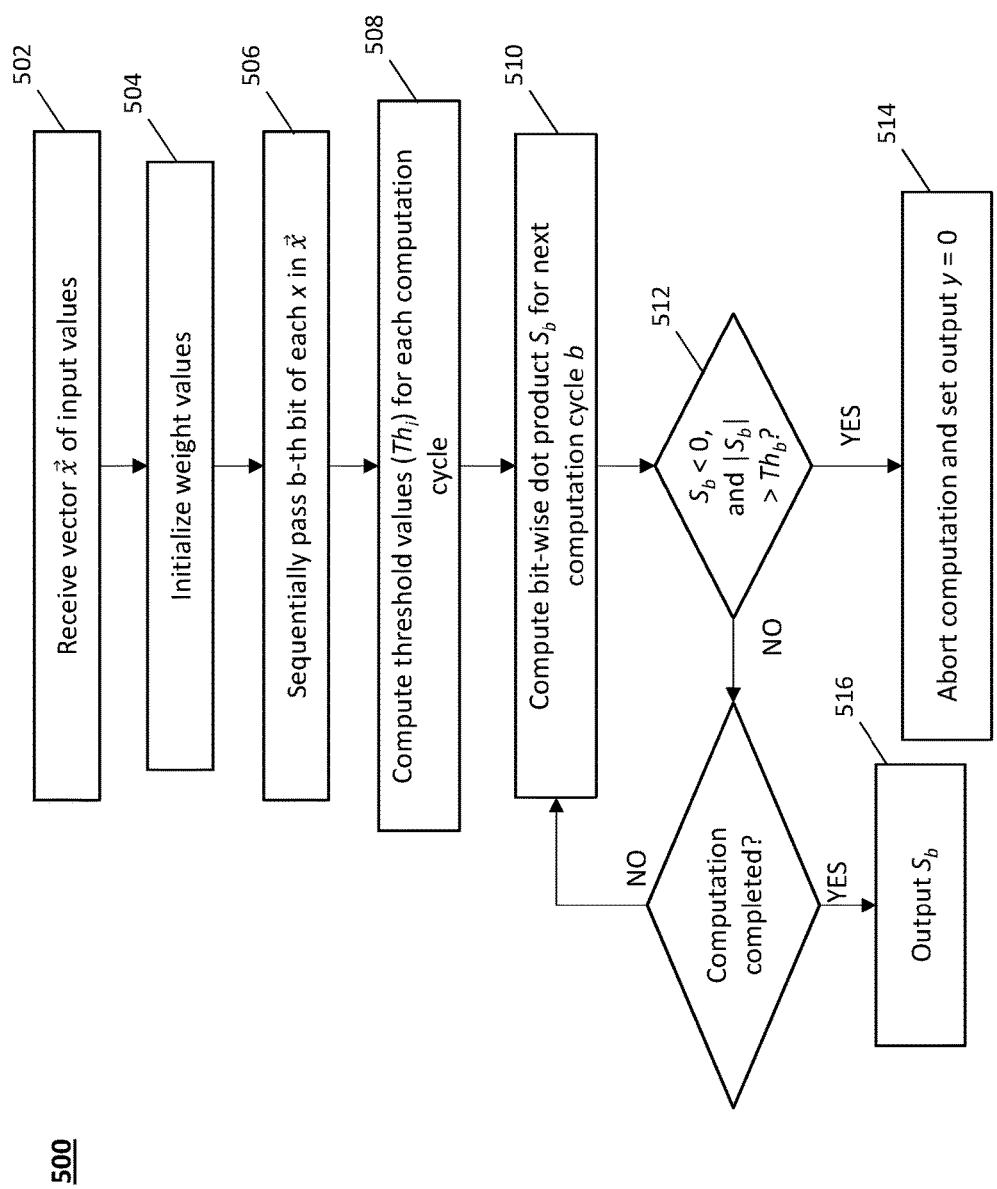
FIG. 5 depicts a flowchart of a method for computing a dot product in a bit-wise manner using the ReLU according to one or more embodiments of the present invention.

FIG. 5 depicts a flowchart of a method for computing a dot product in a bit-wise manner using the ReLU 410 according to one or more embodiments of the present invention. The method 500 includes receiving the input vector $\vec{x}$ that includes N x values, each x being represented using B-bits, at block 502. The method 500 also includes receiving the initial weight vector $\vec{w}$ that includes N w values, each w being represented as B-bit number, at block 504. The method 500 further includes inputting the b-th bits of each x value during the b-th cycle of computation, at block 506. The ReLU 410 uses MSB-first computing, which provides an opportunity to filter-out potential negative values at an early stage as described herein.

The method 500 further includes computing threshold values for each computation cycle of the bit-wise dot product computation, at block 508. It should be noted that some of the operations of the method 500 can be performed in a sequence that is different from what is described herein. For example, the threshold values can be computed earlier, as soon as the weight values are initiated, in one or more examples. Such change in sequence of some of the operations would be obvious to a person skilled in this art, for example, to optimize the operation such as to parallelize some operations. The threshold values are stored in the threshold table in the memory 430. In one or more examples, the memory includes B memory registers or other types of storage locations to store the B threshold values, one for each of the B computation cycles. In one or more embodiments of the present invention, the threshold values are computed using following formula: $TH_b=(2^{-b}+2^{-b+1}+\ldots+2^{-1})\Sigma_{i\in G_p}w_i$, where $G_p$=group of positive $w_i$, and b is the computation cycle for which the threshold is being computed.

The method 500 further includes computing the value $S_b$ for the b-th computation cycle, at block 510.

The method 500 further includes, during each b-th computation cycle, comparing, using the comparator 420, the accumulated $S_b$ value with the $Th_b$ threshold value, at block 512. If the $S_b$, total accumulated result, is negative, and the absolute magnitude is too large, further computations cannot turn the result into a positive value. Accordingly, the comparator 420 checks if $S_b<0$, and if $|S_b|>Th_b$. If both these conditions are met, the controller 440 predicts that the result of the dot product is negative, and accordingly, aborts the computation and sets the output to 0, at block 514. Accordingly, the ReLU 410 can save further time and resources that might have been used for the dot product computation and instead, can start another (next) dot product computation. Alternatively, if the conditions are not met, the ReLU 410 continues the dot product computation for the next bits in the x values, by repeating the above operations. The operations in the method 500 are repeated until a negative value is predicted or until the dot product is computed (after B computation cycles). The result of the dot product is output as the result of the activation function in this case, at block 516.

Figure 6:
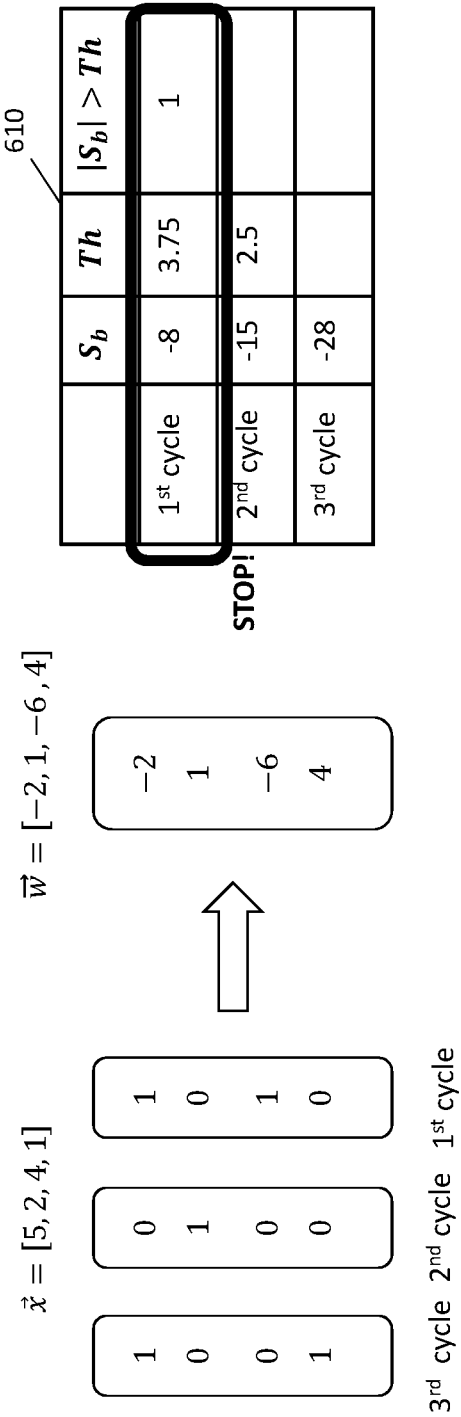
FIG. 6 depicts an example scenario of operation of one or more embodiments of the present invention.

Consider the example scenario shown in FIG. 6. The input vector and the weight vector are shown with example values. Here N=4, B=4. It is understood that the values used in this example are for explanation, and that in one or more embodiments of the present invention, the values can be different, and in most cases much larger. In this example, the $G_p$ set only includes two values {1, 4} from the weight vector as the other weight values are negative. The threshold values for the cycles are shown in the table 610. The $S_b$ values for first three computation cycles (b=1, b=2, and b=3) are also shown in the table 610.

As can be seen, in this case, the ReLU 410 can predict that the output will be negative value by only calculating one cycle (because $|S_b|>Th_b$). Accordingly, the ReLU 410 can abort the computation after the first cycle and start a different computation altogether.

By providing such predictions embodiments of the present invention provide power and speed benefits among other advantages. For instance, statistically, roughly 50% of $\vec{x}\cdot\vec{w}$ are negative in neural network algorithms according to empirical data. Further, out of B-bits, computation is terminated approximately after 40% of B-bits are computed by assuming uniform distributed values of $w_i$. Therefore, 30% [=0.5*(1−0.4)] power and 30% speed benefits are expected by using embodiments of the present invention. Further yet, in terms of energy-delay-product, about 51% improvement is expected (0.7*0.7=0.49) because of embodiments of the present invention.

It should also be noted that the use of the table 430 and comparator 420 occur only once after N elements' addition in the adder tree 320. The table 430 can be registers to store B words (thresholds) and the comparator 420 can be a subtractor. Considering that typical vector length N is quite large (e.g., >512) compared to B (e.g. 16), the area of the table 430 and the comparator 420 is amortized in the ReLU design, occupying negligible portion of entire hardware.

Figure 7:
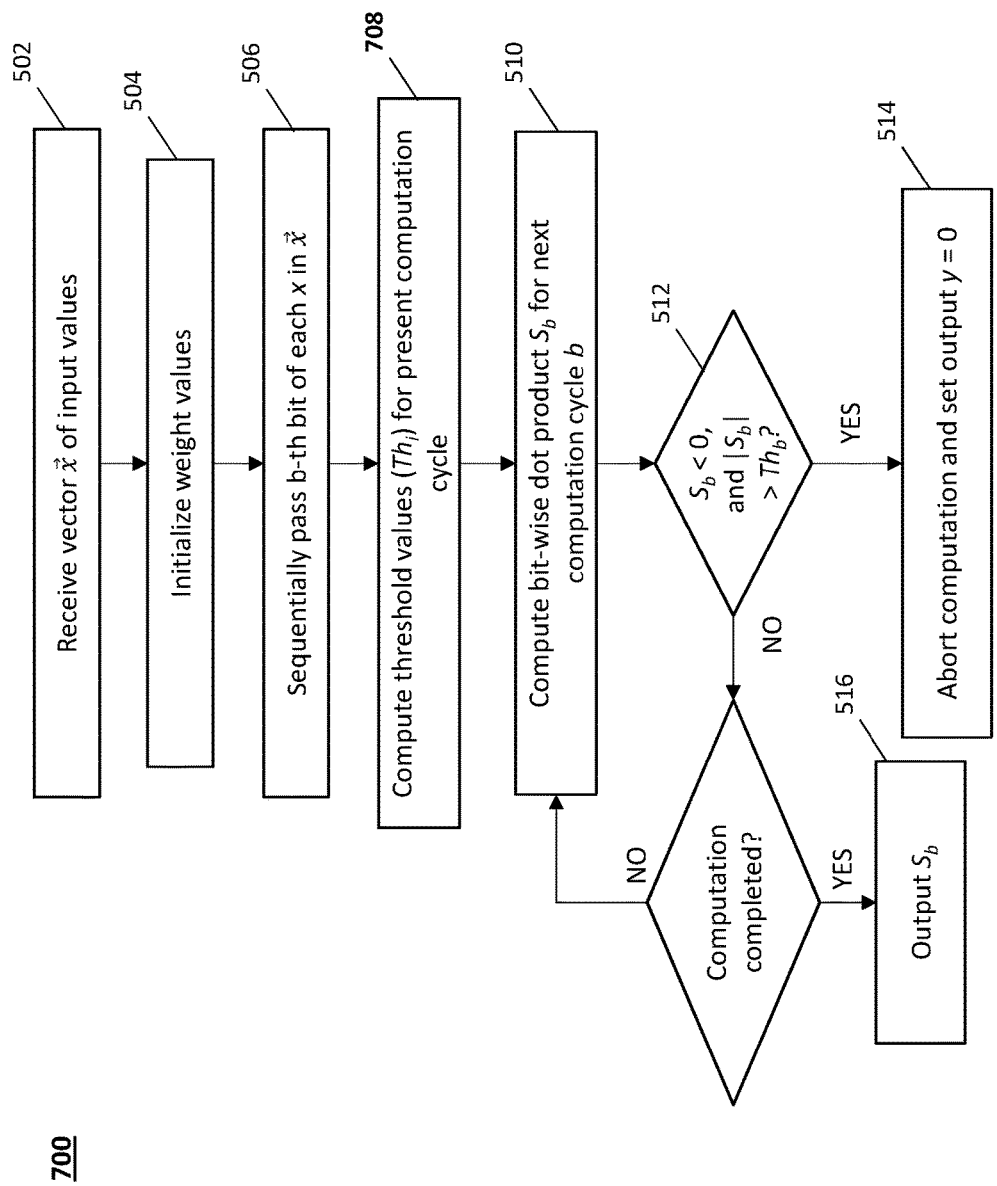
FIG. 7 depicts a flowchart of another method for computing a dot product in a bit-wise manner using the ReLU according to one or more embodiments of the present invention.

FIG. 7 depicts a flowchart of another method for computing a dot product in a bit-wise manner using the ReLU 410 according to one or more embodiments of the present invention. In this method 700, compared to the method 500 described herein, the respective threshold values are computed at runtime (dynamically) during each computation cycle. Accordingly, the threshold values do not have to be precomputed and stored in a threshold table. This in turn facilitates having a single register as part of the memory 430 to store the threshold value for the ongoing (or about to be started) computation cycle. This further reduces the area requirement of the ReLU 410 because fewer memory locations are now required.

As shown in FIG. 7, the method 700 includes receiving the input vector $\vec{x}$, receiving the initial weight vector $\vec{w}_i$, and inputting the b-th bits of each x value during the b-th cycle of computation, at blocks 502, 504, and 506, as described herein. Further, during the b-th computation cycle, the ReLU 410 computes the threshold value $Th_b$ for the ongoing b-th cycle itself, at block 708. In this case, $W(=\Sigma_{i \in G_p} w_i)$ is precomputed and stored in the memory 430. The threshold value is computed at real time using only shift ($2^{-b}$) and one subtraction per step using the formula:

$$Th_b = \frac{(1+2+\ldots+2^{b-1})W}{2^b} = \frac{(2^b-1)W}{2^b} = 1 - 2^{-b}W$$

The method 700 proceeds similar to the method 500 after this, by computing the value $S_b$ for the b-th computation cycle, at block 510. The method 700 further includes, comparing, using the comparator 420, the accumulated $S_b$ value with the $Th_b$ threshold value, at block 512. The comparator 420 checks if $S_b<0$, and if $|S_b|>Th_b$, and if both these conditions are met, the controller 440 predicts that the result of the dot product is negative. Accordingly, the controller 440 aborts the computation and sets the output of the activation function to 0, at block 514. The output can be set to zero using a multiplexer. Accordingly, the ReLU 410 can save further time and resources that might have been used for the dot product computation and instead, can start another (next) dot product computation. Alternatively, if the conditions are not met, the ReLU 410 continues the dot product computation for the next bits in the x values, by repeating the above operations. The operations in the method 500 are repeated until a negative value is predicted or until the dot product is computed (after B computation cycles). The result of the dot product is output as the result of the activation function in this case, at block 516.

In yet other embodiments of the present invention, the method for computing a dot product in a bit-wise manner using the ReLU 410 can further improves the efficiency of the activation function computation by the ReLU 410, particularly in the case where the input values x are being received from another ReLU layer in the neural network 100. As described earlier, empirical data indicates that if the previous layer is also ReLU, approximately half of the $x_i$'s are zero in average number of cases. Accordingly, the efficiency of the ReLU 410 can be further improved by disabling the branches with $x_i=0$. To this end, the threshold (Th) is dependent to $x_i$, and is not precomputed. Computing the threshold is performed using only one N-input addition (to calculate $\Sigma_{i \in G_p \cap G_n} w_i$) at the beginning, and one subtraction and logical shift per computation cycle. Here, $G_n$ is a set of non-negative $x_i$s.

Accordingly, in this case, the memory 430 is populated with $W=\Sigma_{i \in G_p \cap G_n} w_i$. Further, during each computation b-th cycle, the threshold for that particular computation cycle is computed as:

$$Th_b = \frac{1+2+\ldots+2^{b-1}}{2^b}W = \frac{(2^b-1)W}{2^b} = 1-2^{-b}W$$

Figure 8:
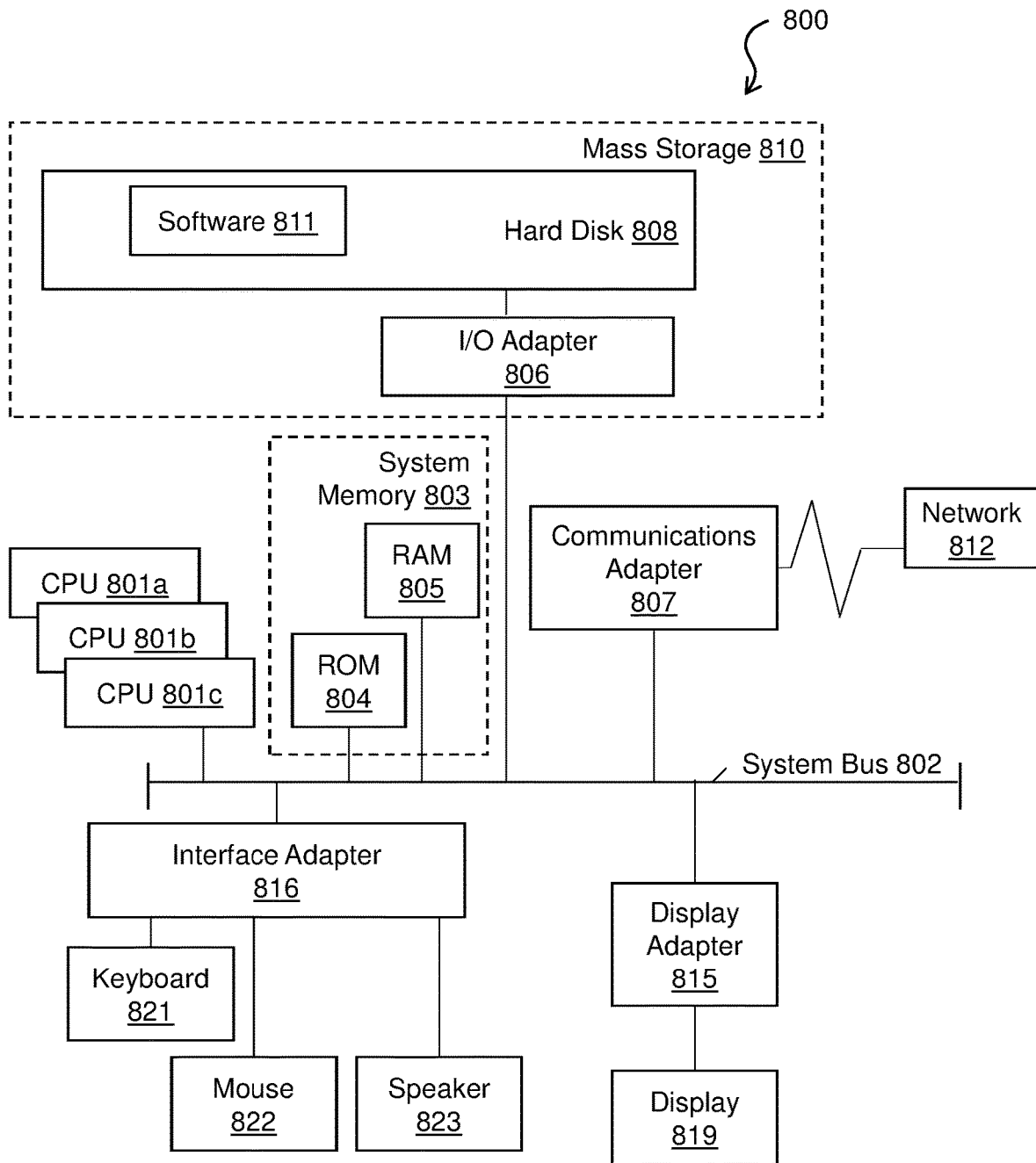
FIG. 8 depicts a computer system that can implement one or more embodiments of the present invention.

Turning now to FIG. 8, a computer system 800 is generally shown in accordance with an embodiment. The computer system 800 can be an electronic, computer framework comprising and/or employing any number and combination of computing devices and networks utilizing various communication technologies, as described herein. For example, the computer system 800 can include one or more of the ReLUs as described herein to implement an artificial neural network system. Alternatively, or in addition, the computer system 800 controls an array of multiple instances of an ReLU that is described herein, wherein the array is used to implement an artificial neural network system. The computer system 800, accordingly, acts as a controller that can input data to the ReLU, instruct the ReLU to perform certain operations (such as computing, aborting etc.), and receive output from the ReLU. Further, the computer system 800 can cause one ReLU, or a layer (or set) of ReLUs to output data to another ReLU, or another set of ReLUs.

The computer system 800 can be easily scalable, extensible, and modular, with the ability to change to different services or reconfigure some features independently of others. The computer system 800 may be, for example, a server, desktop computer, laptop computer, tablet computer, or smartphone. In some examples, computer system 800 may be a cloud computing node. Computer system 800 may be described in the general context of computer system executable instructions, such as program modules, being executed by a computer system. Generally, program modules may include routines, programs, objects, components, logic, data structures, and so on that perform particular tasks or implement particular abstract data types. Computer system 800 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, the computer system 800 has one or more central processing units (CPU(s)) 801*a*, 801*b*, 801*c*, etc. (collectively or generically referred to as processor(s) 801). The processors 801 can be a single-core processor, multi-core processor, computing cluster, or any number of other configurations. The processors 801, also referred to as processing circuits, are coupled via a system bus 802 to a system memory 803 and various other components. The system memory 803 can include a read only memory (ROM) 804 and a random access memory (RAM) 805. The ROM 804 is coupled to the system bus 802 and may include a basic input/output system (BIOS), which controls certain basic functions of the computer system 800. The RAM is read-write memory coupled to the system bus 802 for use by the processors 801. The system memory 803 provides temporary memory space for operations of said instructions during operation. The system memory 803 can include random access memory (RAM), read only memory, flash memory, or any other suitable memory systems.

The computer system 800 comprises an input/output (I/O) adapter 806 and a communications adapter 807 coupled to the system bus 802. The I/O adapter 806 may be a small computer system interface (SCSI) adapter that communicates with a hard disk 808 and/or any other similar component. The I/O adapter 806 and the hard disk 808 are collectively referred to herein as a mass storage 810.

Software 811 for execution on the computer system 800 may be stored in the mass storage 810. The mass storage 810 is an example of a tangible storage medium readable by the processors 801, where the software 811 is stored as instructions for execution by the processors 801 to cause the computer system 800 to operate, such as is described herein below with respect to the various Figures. Examples of computer program product and the execution of such instruction is discussed herein in more detail. The communications adapter 807 interconnects the system bus 802 with a network 812, which may be an outside network, enabling the computer system 800 to communicate with other such systems. In one embodiment, a portion of the system memory 803 and the mass storage 810 collectively store an operating system, which may be any appropriate operating system, such as the z/OS or AIX operating system from IBM Corporation, to coordinate the functions of the various components shown in FIG. 8.

Additional input/output devices are shown as connected to the system bus 802 via a display adapter 815 and an interface adapter 816 and. In one embodiment, the adapters 806, 807, 815, and 816 may be connected to one or more I/O buses that are connected to the system bus 802 via an intermediate bus bridge (not shown). A display 819 (e.g., a screen or a display monitor) is connected to the system bus 802 by a display adapter 815, which may include a graphics controller to improve the performance of graphics intensive applications and a video controller. A keyboard 821, a mouse 822, a speaker 823, etc. can be interconnected to the system bus 802 via the interface adapter 816, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 8, the computer system 800 includes processing capability in the form of the processors 801, and, storage capability including the system memory 803 and the mass storage 810, input means such as the keyboard 821 and the mouse 822, and output capability including the speaker 823 and the display 819.

In some embodiments, the communications adapter 807 can transmit data using any suitable interface or protocol, such as the internet small computer system interface, among others. The network 812 may be a cellular network, a radio network, a wide area network (WAN), a local area network (LAN), or the Internet, among others. An external computing device may connect to the computer system 800 through the network 812. In some examples, an external computing device may be an external webserver or a cloud computing node.

It is to be understood that the block diagram of FIG. 8 is not intended to indicate that the computer system 800 is to include all of the components shown in FIG. 8. Rather, the computer system 800 can include any appropriate fewer or additional components not illustrated in FIG. 8 (e.g., additional memory components, embedded controllers, modules, additional network interfaces, etc.). Further, the embodiments described herein with respect to computer system 800 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Although specific embodiments of the invention have been described, one of ordinary skill in the art will recognize that numerous other modifications and alternative embodiments are within the scope of the invention. For example, any of the functionality and/or processing capabilities described with respect to a particular system, system component, device, or device component may be performed by any other system, device, or component. Further, while various illustrative implementations and architectures have been described in accordance with embodiments of the invention, one of ordinary skill in the art will appreciate that numerous other modifications to the illustrative implementations and architectures described herein are also within the scope of this invention. In addition, it should be appreciated that any operation, element, component, data, or the like described herein as being based on another operation, element, component, data, or the like may be additionally based on one or more other operations, elements, components, data, or the like. Accordingly, the phrase "based on," or variants thereof, should be interpreted as "based at least in part on."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for improving the efficiency of computing an activation function in a neural network system, the method comprising:
    initializing, by a controller, a plurality of weights in a weight vector associated with the neural network system;
    receiving, by the controller, an input vector with a plurality of input values for computing a dot product with the weight vector for the activation function, which determines an output value of a node in the neural network system;
    predicting, by a rectifier linear unit (ReLU), which computes the activation function, an output value of the node;
    in response to predicting that the output value of the node will be negative based on computing an intermediate value for computing the dot product, and based on a magnitude of the intermediate value exceeding a precomputed threshold value wherein the precomputed threshold value for a b-th computation cycle is computed as $TH_b = (2^{-b} + 2^{-b+1} + \ldots + 2^{-1})\Sigma_{i \in G_p} w_i$, where w represents the weights, $G_p$=group of positive $w_i$, and b<=number of bits in the input values terminating, by the ReLU, the computation of the dot product, and outputting a 0 as the output value.

2. The computer-implemented method of claim 1, wherein the intermediate value is computed at each b-th computation cycle using the b-th bit from each input value, and a sign of the intermediate value is negative.

3. The computer-implemented method of claim 2, wherein the precomputed threshold value is unique to the b-th computation cycle.

4. The computer-implemented method of claim 2 further comprising, determining a respective precomputed threshold for each computation cycle corresponding to a number of bits used to represent each of the input values.

5. The computer-implemented method of claim 4, wherein the plurality of precomputed thresholds is stored in a threshold table in the ReLU.

6. The computer-implemented method of claim 1 further comprising, in response to predicting that the output value will be non-negative, continuing the computation of the dot product.

7. A system for implementing a machine learning function, the system comprising:
    at least one rectifier linear unit (ReLU); and
    at least one controller coupled with the at least one ReLU and configured to perform a method for computing an activation function, the method comprising:
    initializing a plurality of weights in a weight vector;
    receiving an input vector with a plurality of input values for computing the dot product of the input vector with the weight vector;
    predicting an output value of the activation function;
    in response to predicting that the output value of the activation function will be negative based on computing an intermediate value for computing the dot product, and based on a magnitude of the intermediate value exceeding a precomputed threshold value, wherein the precomputed threshold value for a b-th computation cycle is computed as $TH_b = (2^{-b} + 2^{-b+1} + \ldots + 2^{-1})\Sigma_{i \in G_p} w_i$, where w represents the weights, $G_p$=group of positive $w_i$, and b<=number of bits in the input values terminating the computation of the dot product, and outputting a 0 as the result of the activation function.

8. The system of claim 7, wherein the intermediate value is computed at each b-th computation cycle using the b-th bit from each input value, and a sign of the intermediate value is negative.

9. The system of claim 8, wherein the precomputed threshold value is particular to the b-th computation cycle.

10. The system of claim 8, wherein the method further comprises, determining a respective precomputed threshold for each computation cycle corresponding to a number of bits used to represent each of the input values.

11. The system of claim 10, wherein the plurality of precomputed thresholds is stored in a threshold table in the ReLU.

12. The system of claim 7, wherein the method further comprises, in response to predicting that the output value will be non-negative, continuing the computation of the dot product.

13. A rectifier linear unit (ReLU) comprising:
a storage medium;
a comparator;
a plurality of multipliers; and
an adder tree;
wherein, the ReLU is configured to perform a method for computing an activation function, the method comprising:
receiving a plurality of weights values in to setup a weight vector;
receiving an input vector with a plurality of input values for computing a dot product of the input vector and the weight vector;
predicting an output value of the activation function;
in response to predicting that the output value of the activation function will be negative based on computing an intermediate value for computing the dot product, and based on a magnitude of the intermediate value exceeding a precomputed threshold value, wherein the precomputed threshold value for a b-th computation cycle is computed as $TH_b=(2^{-b}+2^{-b+1}+\ldots+2^{-1})\Sigma_{i \in G_p} w_i$, where w represents the weights, $G_p$=group of positive $w_i$, and b<=number of bits in the input values terminating the computation of the dot product, and outputting a 0 as the result of the activation function.

14. The ReLU of claim 13, wherein the intermediate value is computed at each b-th computation cycle using the b-th bit from each input value, and a sign of the intermediate value is negative.

15. The ReLU of claim 14, wherein the precomputed threshold value is particular to the b-th computation cycle.

16. The ReLU of claim 14, wherein the method further comprises, determining a respective precomputed threshold for each computation cycle corresponding to a number of bits used to represent each of the input values.

17. The ReLU of claim 16, wherein the plurality of precomputed thresholds is stored in a threshold table in the storage medium.

18. The ReLU of claim 13, wherein the method further comprises, in response to predicting that the output value will be non-negative, continuing the computation of the dot product.

* * * * *